J. A. HAZELQUIST.
FILM CAMERA.
APPLICATION FILED AUG. 9, 1920.
1,427,954.  Patented Sept. 5, 1922.
2 SHEETS—SHEET 1.
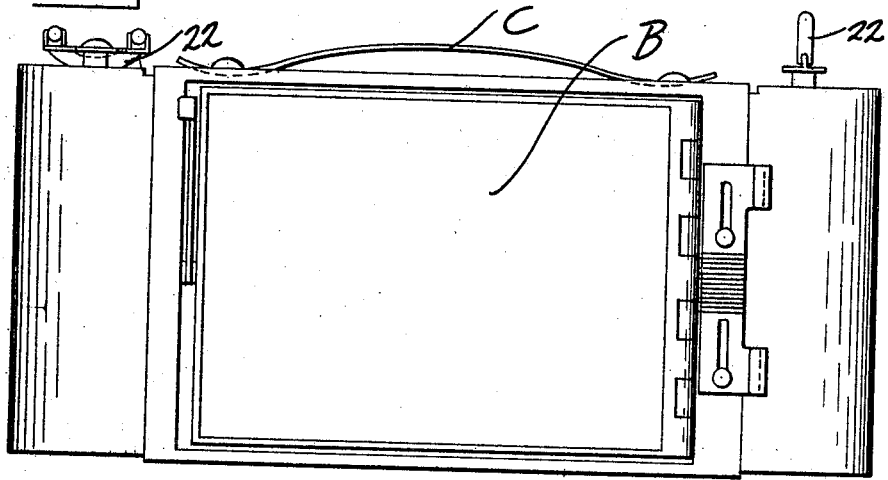
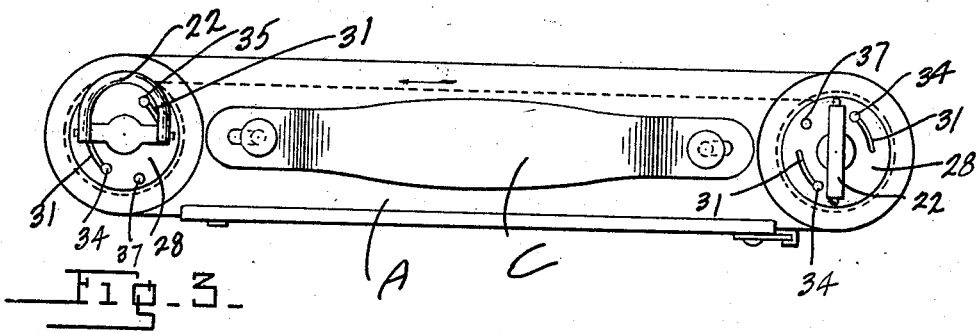
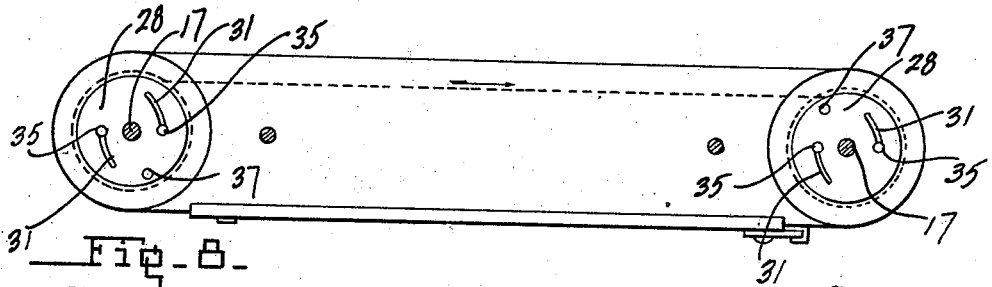
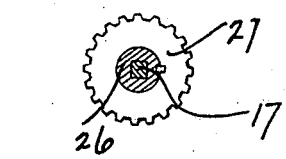
Inventor
Joseph A. Hazelquist
By Lancaster and Allwine
His Attorneys

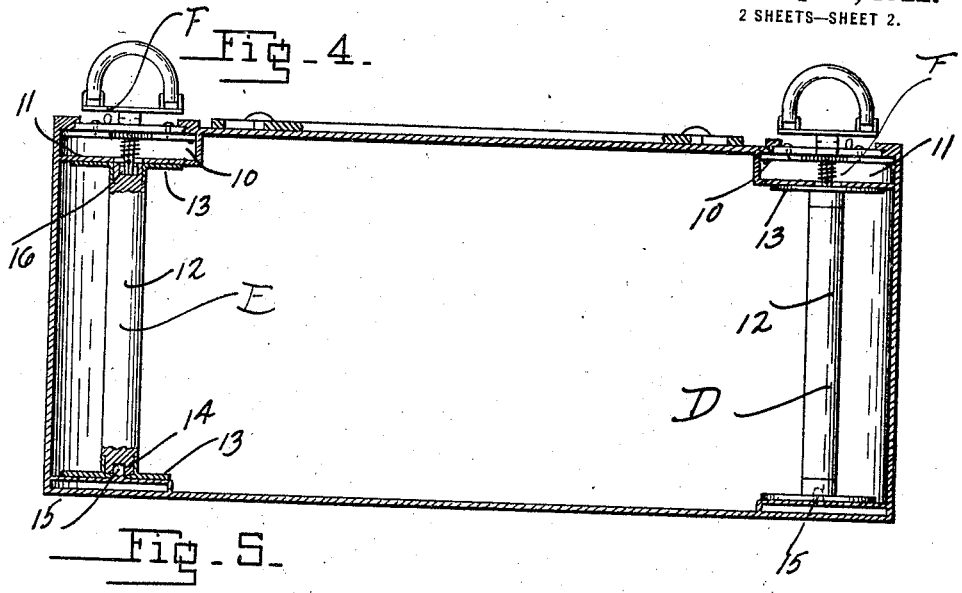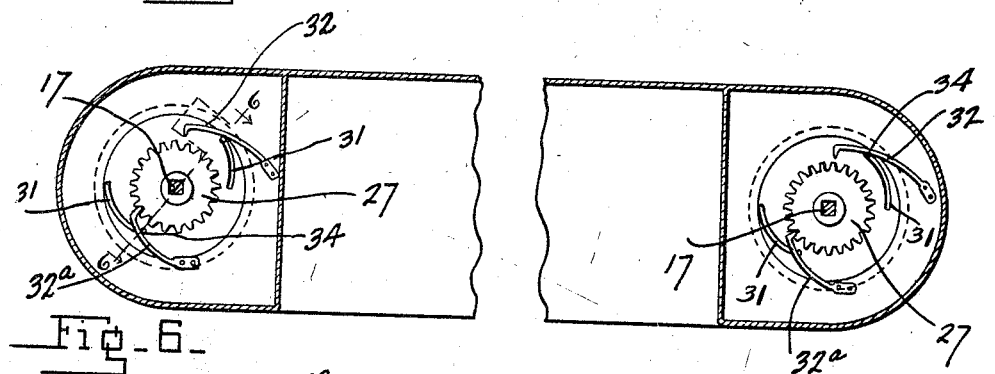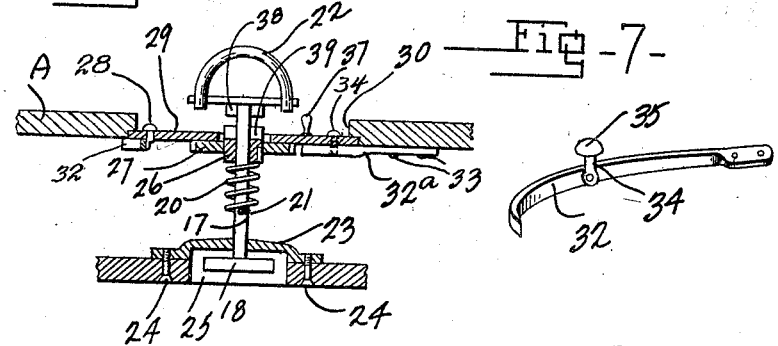

Patented Sept. 5, 1922.

1,427,954

UNITED STATES PATENT OFFICE.

JOSEPH A. HAZELQUIST, OF AMERY, WISCONSIN.

FILM CAMERA.

Application filed August 9, 1920. Serial No. 402,120.

*To all whom it may concern:*

Be it known that I, JOSEPH A. HAZELQUIST, a citizen of the United States, residing at Amery, in the county of Polk and State of Wisconsin, have invented certain new and useful Improvements in Film Cameras, of which the following is a specification.

This invention relates to improvements in film roll cameras.

An important object of the invention is the provision of a camera in which the film roll can be wound as in the ordinary manner to expose consecutive parts thereof, in which I embody means whereby the film can be reversed to properly adjust an exposure thereof.

A further object of the invention is the provision of a camera which is durable, efficient, and of such simple construction as to involve a minimum of parts thus taking a minimum of space within the camera.

A further object of the invention is the provision of means operable from the exterior of the case to permit turning of the key in a direction to wind a film roll; and which key can be adjusted to permit unwinding of the same spool; while at the same time preventing movement in a direction opposite from that for which the means is adjusted.

Further objects of the invention will appear in the course of the following detailed description.

In the accompanying drawings forming a part of this specification and in which reference characters designate like parts throughout the same, Figure 1 is a plan view of an ordinary type of camera having the improvement thereon.

Fig. 2 is a side elevation showing the improved camera.

Fig. 3 is a side elevation partly in section showing the adjusting means for the camera.

Fig. 4 is a plan view in cross section, showing the operating parts of the camera.

Fig. 5 is an end enlarged elevation partly in section showing part of the internal construction.

Fig. 6 is an enlarged fragmentary sectional view of part of the operating means, and taken on the line 6—6 of Figure 5.

Fig. 7 is a perspective view of a detail embodied in the camera construction.

Fig. 8 is a view partly in cross section showing the ratchet wheel.

In the drawings wherein for the purpose of illustration is shown a preferred embodiment of my invention, the letter A designates a camera casing, having the conventional cover and operating mechanism B thereon; and the carrying strap C attached thereto. A spool D is adapted to receive the exposed film, from a spool E, upon which the unexposed film is ordinarily rolled; each of said spools being detachably mounted within the casing A; and having mechanism F detachably connected therewith to permit operation.

The casing A is preferably provided with offset portion 10 mounted within the casing, and which have the recesses 11 therein for containing the internal part of the operating mechanism. The spools D and E shown in the drawings are of standard construction, and each comprises the circular body portion 12 provided with flanges 13 and recesses 14, adapted to receive the projection 15, which is preferably rigidly mounted upon the interior of the casing A; while an opposite end is provided with the recesses 16, ordinarily in the form of an elongated slot for receiving the key 17.

In the construction of the improved camera it is preferred that an operating mechanism F be positioned upon each end of the camera, in such manner as to engage an end of the winding spool; and an end of the film spool. It is to be understood, however, that the operating mechanisms F do not necessarily have to be both positioned upon the same side of the camera. The operating mechanisms F are identical in construction and comprise a key 17 having the member 18 positioned upon the end projecting into the camera casing, for the purpose of turning the spool. The key 17 is normally urged into the slot 16 in the spool by a spring 20 acting upon the pin 21 which is placed transversely through the key 17, and which can be compressed by pulling upon the handle 22 of the key for withdrawing the member 18 from the spool. It is to be observed that in withdrawing the key 17 the member 18 will strike against a cap 23 detachably mounted upon the inside of the casing 10 as by screw 24 or the like, thus preventing any further withdrawal of the key 17. However, the key 17 can be withdrawn so that the head 18 thereof is positioned within the recess 25 of the casing A, thus permitting removal of the film spool. A collar 26 is loosely mounted upon the stem of the key 17; and has a ratchet wheel 27 keyed thereto. A disc 28 preferably circular in formation is mounted intermediate the ratchet wheel 27 and the casing A in such manner that a face 29 thereof seals the recess 30 provided in the casing A; and whereby the disc 28 can be operated for adjusting the mechanism F. The disc 28 is furthermore provided with arcuate slots 31, eccentrically disposed therein with respect to the center of the disc; and the center of the key 17; and upon opposite sides of the center of said disc. The spring pawls 32 are rigidly secured to the casing A as by rivets 33 and are each provided with a projecting pin 34 pivotally mounted thereon, and which projects through the slots 31 in the disc 28, and have heads 35 formed upon the outer end thereof to prevent disconnection therewith.

In operating the device the disc 28 is oscillated by means of the knob 37 until the spring pawl 32 has been lifted out of engagement with the teeth of the ratchet wheel 27 by means of the projection 34 riding in the eccentric slots 31. Since the spring 20 is compressed between the collar 26 and the pin 21, it follows that the key can be turned until the projection 38 immediately below the handle is positioned within the recess 39 of the collar 26; and the end 18 has been positioned in the spool E. A similar operation is effected upon the other operating mechanism F, and the film is now ready to be used. Should the operator make the mistake of unwinding too much of the unexposed film, it is necessary to reverse the film. This operation is merely effected by oscillating the disc 28 by means of the knob 37 until the pawls 32ª of each of the operating mechanisms F is out of engagement with the teeth of the ratchet 27; and the pawls 32 are in engagement therewith. After the operator has turned back to the desired position, the original position of the operating mechanism F is then resumed.

It can readily be seen that the adjusting mechanism F can be adjusted at any time for winding or unwinding of the film, and independent of the amount of film wound on either spool D or E. The sensitized surface of a film, of course, always faces the spool in one direction, either during winding or unwinding.

It is to be understood that the form of my invention herewith shown is to be taken as the preferred example of the same, and that various changes in the shape, size, and arrangement of parts can be made without departing from the spirit of the invention, or the scope of the following claims.

I claim:

1. In a film roll camera, the combination of a casing, film spools therein, and adjustable means on each of said spools for permitting the winding or unwinding of a film on said spools in such manner that the same surface of the film faces inwardly of the spools during winding or unwinding of the same thereon, each of said means preventing the turning of each of said spools in a direction other than that for which they are adjusted.

2. In a film roll camera, the combination, with a camera casing, detachable spools mounted thereon, a key detachably mounted in each of said spools, collars loosely carried by said keys, means normally forcing said keys into locking engagement with the collars and spools, ratchet wheels mounted upon said collars, pawls engaging upon said camera casing, and reversible means whereby said pawls can be brought into engagement with said ratchet wheels for permitting movement of the spools in either direction, said means automatically regulating the turning of said spools in such a manner that they will be prevented from turning in a direction other than that for which they are adjusted.

3. In a roll film camera, the combination, with a camera casing, spools detachably mounted therein, a key detachably mounted in each of said spools, collars loosely carried by said keys, means normally forcing said keys into locking engagement with the collars and spools, ratchet wheels keyed to said collars, oscillating discs interposed between said ratchet wheels and said camera casing, having slots therein eccentrically disposed with respect to the center of said disc, pawls mounted upon said casing, and having projecting portions thereon inserted into the slots upon said discs, to permit movement thereof into and out of engagement with the ratchet wheels upon turning of the discs, thereby automatically regulating the turning of said spools so that they will be prevented from rotating by the keys in a direction other than that for which they are adjusted.

4. In a film roll camera, the combination of a camera casing, spools in said camera casing, detachable keys in engagement therewith, ratchet wheels, pawls adapted to engage said ratchet wheels, an oscillating disc mounted in said casing, and means whereby said disc may be rotated to adjust the pawls in such manner as to permit movement of the spools in either direction.

5. In a film roll camera, the combination of a camera casing, spools in said camera casing, detachable keys in engagement therewith, ratchet wheels, pawls adapted to engage said ratchet wheels, an oscillating disc mounted in said casing, and means whereby said disc may be rotated to adjust the pawls in such manner as to permit movement of the spools in either direction, said means automatically regulating the turning of said spools in such manner that they will be prevented from turning in a direction other than that for which they are adjusted.

6. In a film roll camera, the combination of a casing, a pair of film spools in said casing, ratchet wheels rigid with said film spools, a pair of oppositely working pawls for each of said ratchet wheels, and means for selectively adjusting said pawls on said ratchet wheels, for permitting the winding or unwinding of a film on either of said spools, said means preventing the turning of both of said spools in a direction other than that for which they are adjusted.

7. In a film roll camera, the combination of a casing, film spools rotatably mounted therein, and adjustable means on each of said spools for permitting the winding or unwinding of a film on either of the spools independent of the amount of film wound on said spools, said means preventing the turning of each of said spools in a direction other than that for which they are adjusted.

JOSEPH A. HAZELQUIST.